United States Patent

[11] 3,586,144

[72] Inventor William C. Rogers
5365 N.W. 36th St., Miami Springs, Fla. 33166
[21] Appl. No. 829,594
[22] Filed June 2, 1969
[45] Patented June 22, 1971

[54] MECHANICAL MOVEMENT AND CONTROL MECHANISM EMPLOYING THE SAME
15 Claims, 10 Drawing Figs.
[52] U.S. Cl............................................................ 192/48.91,
74/10.15, 74/650, 74/710, 192/139, 226/100, 226/110
[51] Int. Cl........................................................F16d 21/04, F16h 35/18
[50] Field of Search...................................... 74/650, 710, 756 NS, 10.15, 10.8; 192/22, 28, 33, 39, 48.9, 48.91, 139; 226/100, 110

[56] References Cited
UNITED STATES PATENTS
3,127582 3/1964 Newhouse et al............. 74/10.15 (X)
2,462,846 3/1949 Clark............................ 74/756 (UX)
2,868,271 1/1959 Pickles......................... 74/710 (X)
3,130,604 4/1964 Johnson et al................ 74/650
FOREIGN PATENTS
515 1/1913 Great Britain................ 74/650

Primary Examiner—Allan D. Herrmann
Attorney—Burns, Doane, Swecker & Mathis

ABSTRACT: A mechanical movement for controlling two rotary outputs from a single rotary input to which both outputs are slip clutched. One output is normally latched while the second output rotates in response to rotation of the input. At a first predetermined point the second output is latched against rotation in one direction and the first output is permitted to rotate in that direction in response to input rotation. Reversal of the angular direction of input rotation results in the locking of the first output while the second output is permitted to rotate in the reverse direction to a second predetermined point at which the second output is again latched and the first output is again freed for rotation in the reverse direction The outputs may be used to position tapes provided with both visible indicia and a machine readable indicia so that both visual indication of the output position and control of an appropriate switching mechanism may be obtained.

INVENTOR
WILLIAM C. ROGERS

BY Burns, Doane, Benedict, Swecker & Mathis
ATTORNEYS

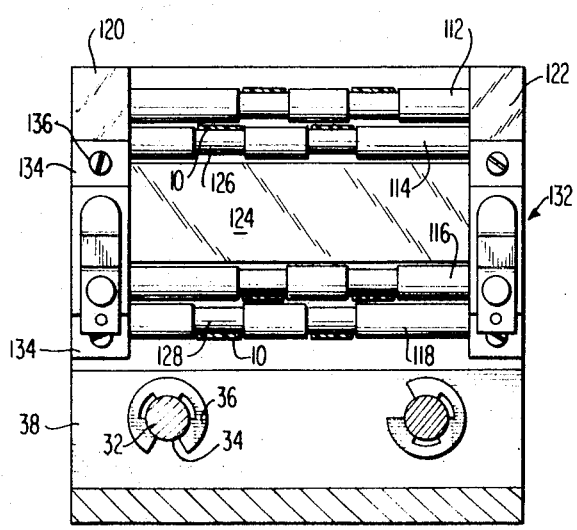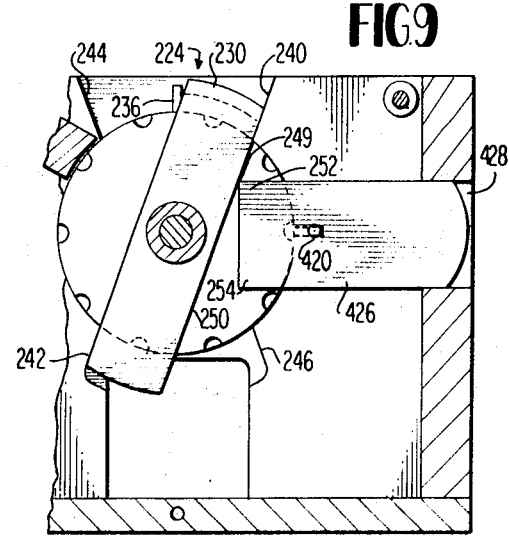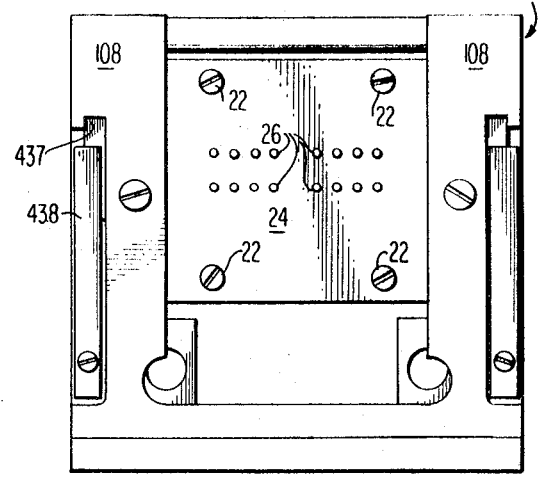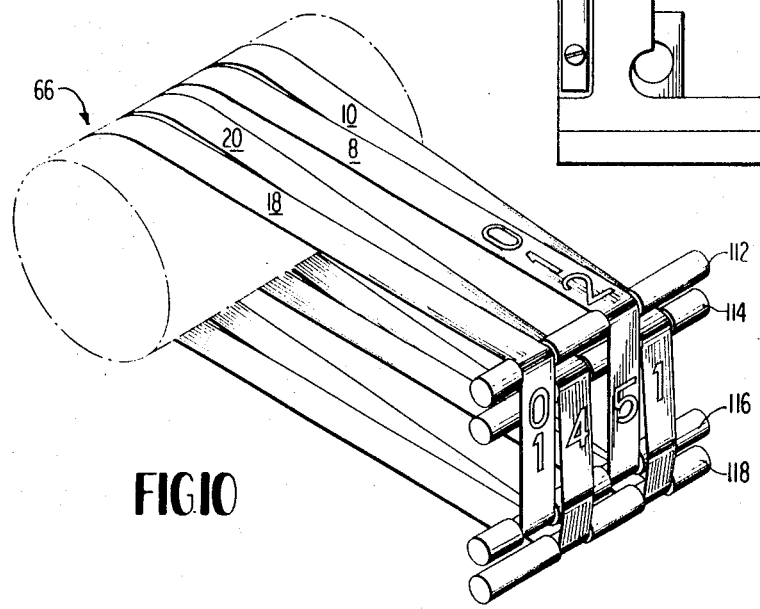

MECHANICAL MOVEMENT AND CONTROL MECHANISM EMPLOYING THE SAME

BACKGROUND OF THE INVENTION

This invention relates to a mechanical movement wherein a single rotary input may be used to control the positions of two rotary outputs. In particular this invention relates to a control mechanism employing that mechanical movement to provide a dual output switching control and a visual indication of the dual output positions.

In remotely controlled positioning systems such as systems for selectively tuning a receiver located remotely from the pilot's position in an airplane to a predetermined frequency, it has been a common practice of the prior art to employ a control assembly for generating an electrical signal representative of desired frequency. The electrical signal thus generated may be used to control the position of a tuning capacitor or inductor or the selection of a crystal for an oscillator.

It is, however, with such control assemblies, often desirable to generate signals representative of wide frequency ranges. This often necessitates the use of separate control knobs associated with various portions of the desired range, or associated with various gross and fine adjustments. For example, one control knob may control gross adjustments between 100 and 900 kilocycles, while another may be used for controlling fine adjustments between 10 and 90 kilocycles. The use of a plurality of control knobs is dangerous in that the pilot's attention is required to release one control knob to find a second control knob. There is, moreover, time lost in the process, which time may be extremely valuable at the speeds at which today's high performance aircraft operate.

It is accordingly an object of the present invention to provide a mechanical movement which controls multiple adjustments with a single control knob thus reducing the number of control elements required to be handled by the operator. The elimination of control knobs in turn reduces the clutter of the control panel and the likelihood of operator confusion in moments of stress.

Control systems, some of which are tuners, have been proposed wherein a single knob controls both fine and gross adjustments. However, the known proposed tuning units are intended to accomplish gross and fine adjustments of a single output system having either a severely limited range or a physical size which becomes prohibitively cumbersome as the range of the output increases.

It is thus another object of the present invention to provide separate wide-range output systems that may be controlled by a single input control knob without excessive enlargement of the physical size of the control system.

It will be appreciated, of course, that a system of the type described is usable not only in tuners, but also in numerical control machining operations and in the vast numbers of systems wherein size or other considerations make the use of a single input for controlling dual outputs desirable.

It is thus still another object of the present invention to provide a novel mechanical movement wherein the rotation of two separate output systems may be controlled by the rotation of a single input.

It is more particular object of the present invention to provide a novel tuner control head having at least two output systems covering different frequency ranges controlled by a single manually operable control knob.

It is a further object of the present invention to provide a novel apparatus for controlling the movement of separate tapes each having a visual indicia to indicate to the operator the position of the tapes and each having a corresponding machine readable indicia which may be sensed to effect appropriate control functions.

It is a further object of the present invention to provide a novel and improved control apparatus, wherein several outputs may be controlled by a single input.

These and other objects and advantages of the present invention will be readily apparent to one skilled in the art to which the invention pertains from the claims and from a perusal of the detailed description of a preferred embodiment in conjunction with the appended drawings.

SUMMARY OF THE INVENTION

A preferred embodiment of the present invention comprises at least two output drum systems controlled by, and slip clutched to, a single control knob. Each drum system may include one or more drums, one of which is normally latched by a spring biased pin while the other is rotatable in response to rotation of the single control knob. When the first system has been rotated in a given direction to a predetermined limit set by a movable mechanical stop, the spring bias on the locking pin is overcome to free the second drum system for rotation in the same direction in response to continued rotation of the control knob.

If the direction of rotation of the control knob is reversed, the mechanical stop permits the spring bias to lock the second drum system in its new position and the first drum system to be reversely rotated. If the first drum system is rotated in the reverse direction until a second mechanical stop is reached, the second drum system will be freed for rotation in the reverse direction. The control process may, of course, be reversed or reinstituted in the same direction as desired.

First and second tapes may be associated with each of the drum systems. These tapes may include visual indicia to indicate the position of the tape to the operator and may be provided with corresponding indicia in a machine readable code to control an appropriate switching system by means of a sensor in proximity to the tapes.

THE DRAWINGS

A preferred embodiment of the invention is illustrated in the form of a control head tuner in the accompanying drawings in which.

Figure 1:
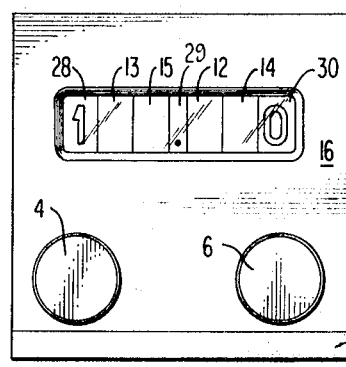
FIG. 1 is a front view of the control head.
Figure 2:
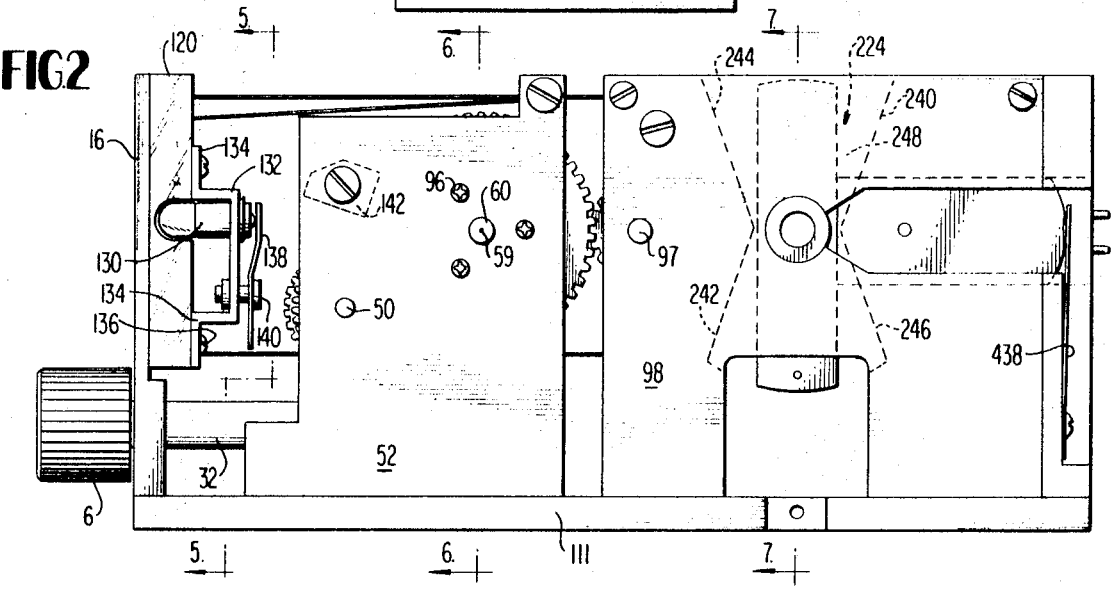
FIG. 2 is a side elevational view of the control head shown in FIG. 1 with the movable stop members shown in phantom.
Figure 4:
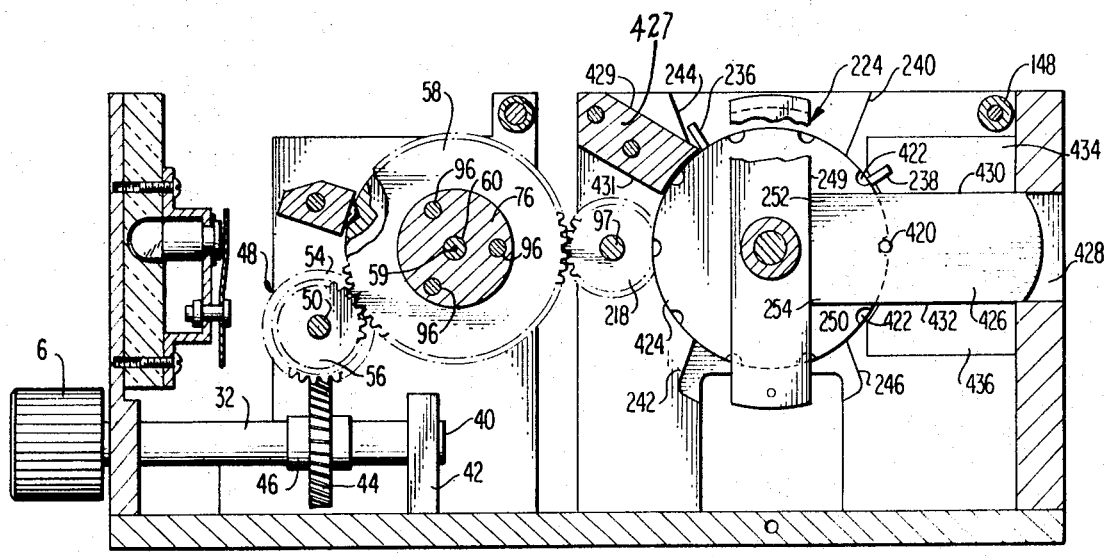
FIG. 4 is a cross-sectional view of the control head shown in FIG. 3 taken along the line 4—4 therein.
Figure 6:
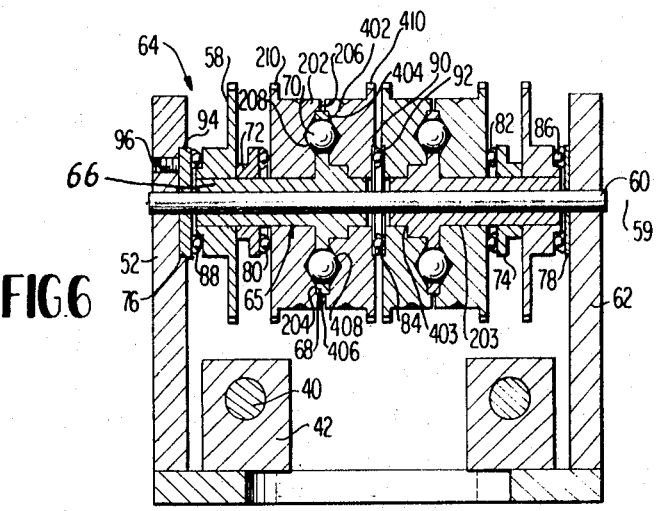
Figure 7:
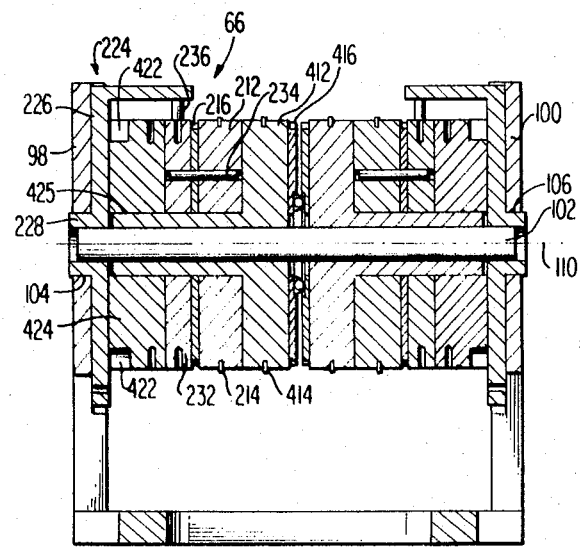

FIGS. 5, 6 and 7 are cross-sectional views of the control head respectively taken along lines 5—5, 6—6 and 7—7 in FIG. 2;

FIG. 8 is a rear view of the control head shown in FIG. 1;

FIG. 9 is a partial cross-sectional view of the stop members shown in FIG. 4, with the stop members in their alternative stop positions; and FIG. 10 is a schematic view of the tape members controlled by the control head.

DETAILED DESCRIPTION

General Summary

Referring to FIG. 1 of the drawings where a control head tuner according to a preferred embodiment of the invention is illustrated, the control head may include a frame or housing 2 having rotatable frequency control knobs 4 and 6 projecting therefrom. The knobs 4 and 6 may be conventionally journaled for rotation in a plane normal to the face 16 of the housing 2 with the knob 6 controlling the position of two endless tapes 8 and 10, and the knob 4 controlling the position of two other endless tapes 18 and 20. Each of the tapes 8, 10, 18 and 20 may be provided with position indicating indicia (see FIG. 10) readable through the window panels 12—15 in the face 16 of the housing 2.

Figure 3:
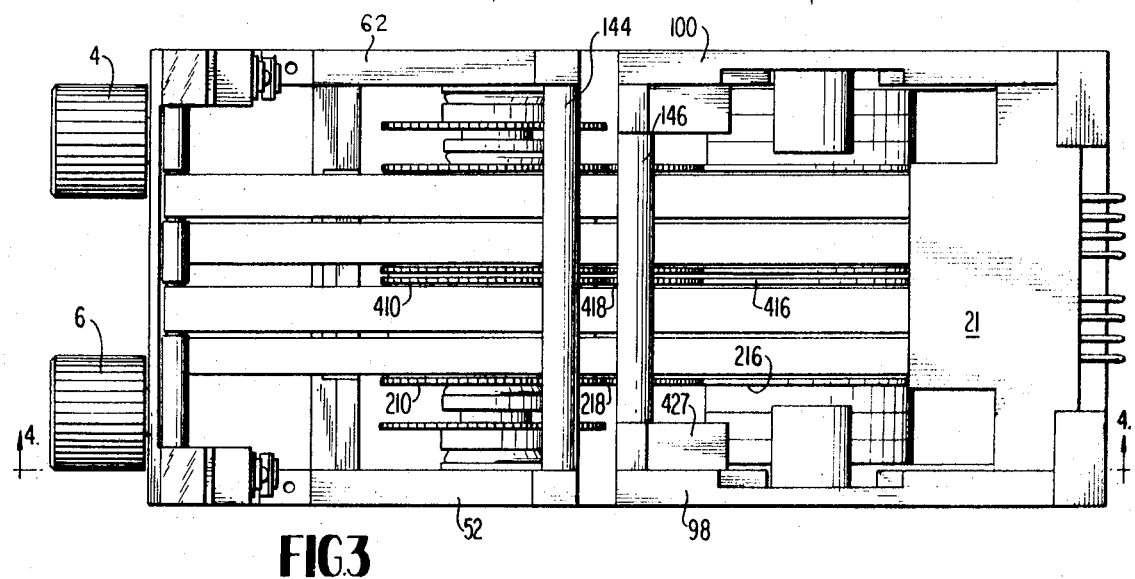
FIG. 3 is a top plan view of the control head shown in FIG. 1.

In addition to the visible tape position indicating indicia on the tapes adjacent the forward end of the housing, each of the tapes 8, 10, 18 and 20 may be supplied with machine readable indicia in any one of a number of conventional codes for reading by suitable sensors (not shown) associated with a contact block 21 (see FIG. 3). The contact block 21 may be conveniently mounted on the rearward end of the housing 2 and may generate an electrical frequency selection signal correlated with the tape position. Suitable means for transferring information from the tapes to the contact block 21 may, for example, include spring-loaded members (not shown) projecting slightly outwardly of the concave face of the contact block and appropriately spaced to cooperate with the indicia on the tapes.

The indicia may be magnetic, electrically conductive to complete a circuit with the drum hereinafter more fully described, or simply apertured to allow longitudinal movement of the members. Alternatively, the tapes may be opaque or transparent and the position of the tapes sensed by the presence, or absence, of the impingement of light from a source within the drum on suitable and conventional photocells on the block 21.

Other acceptable sensing structure variations will, of course, occur to those skilled in the art.

In instances where it may be desirable not to employ tapes, the visual position indicating indicia and the machine readable indicia may both be provided directly on one of the drums of the drum systems thereby enhancing the accuracy of the readout of the coded information by obviating problems associated with the possibility of tape stretching.

Also, if desired, the visible and machine readable indicia may be placed side-by-side or in alternating series on either the tapes or on the drums (if tapes are not employed). In this event, the contact block 2 or other coded information pickoff may be located at a forward and/or upper position in the housing for cooperation with the forward drums of the drum system. Accurate readout may be enhanced since tape stretching does not greatly effect the readout of the machine readable indicia by reason of the fact that such readout is taken from a tape position closely adjacent the visual readout position.

At the portion of the contact block 21 facing outwardly of the housing 2, and mounted thereon by suitable fastening means such as screws 22, may be a rivet terminal board 24 of the type illustrated in FIG. 8. This board 24 may have a plurality of output terminals 26 cooperating with the sensors of the contact block and projecting rearwardly of the housing 2 for electrical connection to a suitable remote tuning unit having, for example, a capacitor with positionable plates or circuits for selectively connecting crystals.

In the preferred and illustrated embodiment changes in frequency may be visually represented in the window panels 12, 13, 14 and 15 by numerical indicia illustrated as being directly associated with the tapes. Three other window panels 28, 29 and 30 may reveal fixed indicia to aid in the ready reference to the frequency range. If desired, a magnified visual readout may be obtained by an arrangement (not shown) including a lens mounted between the numerical indicia and the window panels. The forward drums may be transparent or translucent and a lamp may be mounted within the drums to project the numerals onto the window panels through the magnifying lens.

Movement of both tapes 8 and 10 may be controlled by reversible and separate drum systems connected to the single input 6 in a manner hereinafter more fully described, while movement of the tapes 18 and 20 may be controlled in a similar manner by the input knob 4. In the preferred embodiment, only one of the two drum systems controlled by a given knob is permitted to move at any one time due to the use of alternately operable latching means.

For the purpose of clarity, the parts of the drum systems and latching means primarily associated with the movement of tape 10 will be identified by numerals in the "200" series, while those associated primarily with movement of the tape 8 will be identified by numerals in the "400" series. The drive and stop mechanisms for the tapes 18 and 20 will not be described in detail insofar as they are identical to the drive and stop means of the tapes 10 and 8, respectively, but mirror image disposed.

The Tape Drive or Drum Systems

The reversible drive systems for both the tapes 8 and 10 include the previously mentioned control knob 6 as an input. This knob 6 may be fixedly attached in any suitable manner to a shaft 32 (FIG. 2) which may be journaled in an opening 34 (FIG. 5) in the face 16 of the housing 2 for rotation in both clockwise and counterclockwise directions. A suitable snap ring 36 may be positioned between an annular shoulder (not shown) of the shaft and the internal portion 38 of the face 16 of the housing 2 and the inner end 40 of the shaft 32 rotatably supported by a support block 42 (FIG. 4) mounted within the housing.

In FIG. 4, it may be seen that a helical worm wheel 44 is coaxially mounted on the shaft 32 in a central portion thereof for rotation therewith. This worm wheel 44 may be either integral with the shaft 32 or attached thereto by means of a centrally located, shrink fitted sleeve 46.

The worm wheel 44 drives a double gear 48 which is mounted for rotation by means of an axially extending stub shaft 50 rotatably journaled in a side wall portion 52 of the housing 2 (FIG. 2). Thus, as illustrated, the axis of rotation of the double gear 48 may be approximately normal to the axis of rotation of the worm wheel 44. The axially internal (with respect to the housing 2) portion of the double gear 48 may comprise a takeoff worm wheel 54 (shown in phantom in FIG. 4) that is driven by the worm wheel 44. Integral with the worm wheel 54, but axially outward (with respect to the housing) thereof is a primary drive spur 56, illustrated as having a pitch diameter less than that of the driven worm wheel 54.

It will be appreciated that the double gear 48 may alternatively be driven by a spur gear mounted coaxially with a knurled dial (not shown). A portion of the periphery of this dial may extend outwardly of the housing 2, and the dial may be mounted for rotation about an axis parallel to the double gear stub shaft 50.

A mating input spur gear 58, having a pitch diameter substantially greater than that of the drive spur 56, may be mounted for rotation about an axis 59 defined by a support shaft 60 in a plane substantially parallel to the plane of the drive spur 56. This shaft 60 is substantially fixedly secured to opposite sidewall portions 52 and 62 of the housing (FIG. 6).

From the foregoing, it will be appreciated that all input motion to the subsequently described reversible drum systems which drive the tapes 8 and 10 is provided by means of rotation of the knob 6 as transmitted by rotation of the shaft 38 and worm wheel 44 to the worm wheel 54. Rotation of the worm wheel 54 results in rotation of the integral drive spur 56 to thereby provide input rotation for the input spur 58.

The drum systems for the tapes 10 and 8 respectively include primary drums 202 and 402 mounted for independent rotation about the axis 59 defined by the support shaft 60 (FIG. 6). As used herein, the term "independent rotation" is meant to refer to the fact that either of these primary drums 202 and 402 will be permitted to rotate whether or not the other primary drum is held stationary. However, as will be hereinafter more fully explained, if the primary drum subassembly 64 (as cross-sectionally shown in FIG. 6) is considered as a unit separate from and unconnected to the secondary drum subassembly 66 (as cross-sectionally shown in FIG. 7), rotation of one primary drum while the input spur 58 is held stationary would result in responsive reverse rotation of the other primary drum.

The independent rotational mounting of these primary drums 202 and 402 may be accomplished in any suitable manner so long as, in the absence of any external latching forces, both drums would rotate with the input gear 58. In the preferred and illustrated embodiment, this mounting is accomplished by providing the input gear 58 with axially extending projection 66 fixed thereto and rotatably supported on the support shaft 60. The primary drums 202 and 402 may be frictionally and coaxially mounted on this projection, at 203 and 403, respectively, so as to be normally rotatable therewith. The primary drums 202 and 402 may, however, be held stationary with respect thereto for a purpose hereinafter described.

Fixed to the projection 66 may be an annular cage member 68 having a diameter slightly less than the diameters of the primary drums 202 and 402. This cage member 68 is adapted to be received by, and mate with, the annular depressions 204 and 404 in the complementary and mirror image disposed faces 206 and 406 of the drums 202 and 402.

A plurality of radially spaced balls may be mounted in the cage member 68 to provide a driving connection between the input gear 58 and the primary drums 202 and 402. These balls 70 may conveniently be adapted to contact the registered annular grooves 208 and 408 (generally V-shaped in transverse cross section) in the complementary faces 206 and 406.

Thus, with the drums 202 and 402 pressed tightly toward one another, and with the balls 70 in frictional engagement respectively with the registered grooves 208 and 408, input rotation of the gear 58 by clockwise rotation of the knob 6 (and thereby rotation of the projection 66 and cage member 68) in a clockwise angular direction would normally result in clockwise rotation of both of the primary drums 202 and 402. This responsive rotation is attributable to both the frictional coupling between the primary drums 202 and 402 and the projection 66, and to the frictional contact between each drum and the caged balls 70.

As previously mentioned, the nature of these frictional contacts is such that if the input gear 58 were held stationary and one primary drum were rotated, the other primary drum would rotate in the opposite direction since the balls 70 would also reverse rotate in the fixed cage 68. However, this reverse rotation would not occur during normal operation of the mechanism since the gear 58, rather than being held stationary, provides the input motion to the drums.

The frictional contact between the two primary drums 202 and 402 and the balls 70 is accomplished in the illustrated embodiment by placing suitably sized, coaxial annular shims 72, 74, 76 and 78, and roller bearing assemblies 80, 82, 84, 86 and 88 axially along the support shaft 60.

One shim 72 projects inwardly from the input spur 58 and is preferably integral therewith while a second shim 74 is similarly associated with the (unnumbered) drive spur of the drive assembly for tapes 18 and 20. These shims 72 and 74 may be respectively separated from the outer faces of the outermost primary drums by the antifriction roller bearing assemblies 80 and 82 which permit relative rotation between these drums and the input spur gears.

The inner faces of the innermost primary drums of the two drive assemblies may be provided with registered annular depressions 90 and 92 to receive another roller bearing assembly 84 for separating the two systems thus permitting the completely independent operation thereof.

The remaining shims 76 and 78 may be respectively mounted adjacent the internal portions of the sidewalls 52 and 62. As illustrated, one shim 78 may be separated from the outer face of the input spur (unnumbered) of the drive assembly for tapes 18 and 20 by a further input roller bearing assembly 86. The other shim 76 may be similarly separated from the drive spur 58 by a bearing assembly 88. This latter shim 76 may be fitted in a depression 94 in the sidewall 52 and may be axially adjustable by means of triangularly spaced set screws 96 projecting through that wall and against the shim. This axial adjustment permits a degree of control over the pressure between all elements of the primary drum assembly 64 as well as a degree of control of the axial position of these elements along the support shaft 60. If desired a similar adjustment may be provided on the other shim 78.

From the foregoing, it will be appreciated that rotation of the input gear 58 will normally result in rotation of both of the primary drums 202 and 402 in the same direction due to the frictional fittings. However, if one of the drums, e.g. drum 202, were held stationary, only the other drum 402 would rotate. Thus, the caged balls 70 provide a slip clutch connection between the two drums 202 and 402 and the projection 66.

The primary drums 202 and 402 may be provided respectively on their axially outward faces remote from the cage 68 and balls 70 with integral spur gears 210 and 410. These gears have substantially the same pitch diameter as the input spur gear 58 and provide the first stage of the driving connection between the primary drum subassembly 58 and the secondary drum subassembly 66 (FIG. 7).

This secondary drum system includes tape drive drums 212 and 412, each provided with a plurality of circumferentially projecting and radially spaced sprocket teeth 214 and 414 which cooperate with sprocket holes (not shown) in the tapes 8 and 10 to feed these tapes in response to drum rotation.

Integrally attached to the drum 212 and coaxial therewith, is a secondary drum system driven spur gear 216. The spur gear 216 is driven from an idler gear 218 (FIG. 4) rotatably mounted on a support shaft 97 fixed in the opposite rearward portions 98 and 100 of the housing (FIGS. 2 and 3). The idler gear 218, the primary drive spur gear 210 and the secondary driven spur gear 216 may be substantially coplanar.

Integrally attached to the other tape drive drum 412 and coaxial therewith is another secondary drum system driven spur gear 416. This spur gear 416 may be driven from the primary drive spur gear 410 by means of an interposed idler gear 418 (FIG. 3) rotatably mounted on the idler gear support shaft 97. These three gears 410, 416 and 418 may also be coplanar.

The drum 412, and its associated driven gear 416, may be mounted for rotation together about a secondary drum system support shaft 102 substantially fixed in spaced apertures 104 and 106 in the rearward sidewall portions 98 and 100 of the housing 2. An axially outward, annular projection 419 integral with the drum 412 telescopingly receives the support shaft 102 about which the projection 419 rotates and rotatably supports the other secondary drum 212 and its associated spur gear 216.

REferring now to FIG. 10, the endless tapes 8 and 10 are shown as passing around the schematically illustrated tape drive drums of the secondary drum system 66. Rotation of these drums 212 and 412 results in movement of the tapes by engagement of the sprocket teeth 214 and 414 with sprocket holes in the tapes (not shown). The forward mounting for the tapes will be hereinafter described in further detail.

THE LATCHING MEANS

As previously described, input rotation of the knob 6 would normally result in rotation of both of the primary drums 202 and 402. The primary drums rotation is converted respectively into rotation of the secondary tape drive drums 212 and 412 by means of the gear trains 210–218–218 and 410–418–416 (FIG. 3). However, a first stop means is provided to normally maintain one of the tape drive drums 412, and thereby the tape 8 and the primary drum 202, in a substantially stationary or latched position.

This stop means is provided by a pin 420 (FIG. 4 and 9) selectively engageable with a plurality of notches 422 circumferentially spaced about the outer periphery of a stop control drum 424 (FIG. 7). This drum 424 is suitably mounted for rotation with the inner tape drive drum 412, e.g. by a shrink fitting 425, to the drum projection 419 subsequently to rotatably mounting the outer tape drive drum 212 and its attached parts on that projection 419. It will be appreciated that any other suitable connection between the control drum 424 and the tape drive drum 412 will suffice so long as no substantial relative movement (rotation) between them is permitted.

The pin 420 is fixedly mounted on and projects transversely from a slide member 426. This slide member 426 is mounted for reciprocal translation in a trackway 428 provided by the facing walls 430 and 432 of parallel and spaced inward projections 434 and 436 on the rear sidewall 98 and a guide slot 437 in the rear wall 108 (FIG. 4). The slide member 426 is normally biased forwardly, for example, by means of a cantilevered, vertical leaf spring member 438 at the rear of the housing (FIG. 2). In its forwardly biased position, the pin 420 is engaged in one of the slots 422 to thereby prevent rotation of the stop control drum 424, and, therefore, the tape drive drum 412 and its associated primary drum 402. Thus, the initial driving force provided from the input spur gear 58 results in only movement of the secondary drum 202 and its driven tape 10. The previously described slip clutch connection at the primary drum subassembly permits the relative movement between primary drums 202 and 402.

A second movable and generally L-shaped stop member 224 (see FIG. 7) provides both a means for limiting the movement of the tape 10 and the means for releasing the stop control drum 424 to permit movement of the tape 8 by its drive drum 412. This stop member comprises an elongated body portion 226 provided with an annular generally centrally located stub 228 that is mounted for rotation about the secondary drum support shaft 102. The stub 228 projects axially along the shaft 102 and is snugly, but rotatably received in the wall opening 104 in the sidewall 98. A leg portion 230 of stop member 224 is located at the top thereof and projects inwardly from the sidewall 98 over the control drum 424 and over an adjacent control drum 232 (FIG. 7).

This latter control drum 232 is mounted for rotation about the drum projection 419 with the tape drive drum 212 and the driven gear 216. The drums 232 and 212 and the gear 216 may be integral, or they may be connected, for example, by means of a pin 234.

The range of permitted rotation of the control drum 232, and thereby the tape drive drum 212 and tape 10, is controlled by the placement of two circumferentially spaced pins 236 and 238 (FIGS. 4 and 9) projecting outwardly from the periphery of the control drum 232. As the control drum 232 rotates with the tape drive drum 212, one of the pins, e.g. pin 236 as shown in FIG. 9, eventually engages the side of the leg 230 of the stop member 224 and causes the stop member 224 to pivot about the support shaft 102. Continued rotation of the control drum 232 moves the sidewall of the stop member pivot leg 226 into abutting engagement with a complementary pair of tapered fixed stop abutments 240, 242, 244 and 246 provided along the boundaries of an open faced pivot slot 248 (FIG. 2) defined on the internal portion of the wall 98.

After engagement of the stop member 224 with the tapered portions 240 and 242, the engagement of the pin 236 with the leg 230 prevents further rotation of the drum 232 toward those portions. However, the drum 232 may rotate in the reverse direction until the other pin 238 stops the drum by forcing the stop member 226 into abutment with the tapered surfaces 244 and 246. Since the tape drive drum 212 is fixed to the control drum 232, the movement of the tape 10 is thus limited in both directions.

In the preferred and illustrated embodiment, the movement of the tape 10 is constrained between the "0" and "5" positions. However, the pins 236 and 238 may be spaced to permit greater or lesser movement as desired. Moreover, a single pin may be employed to permit approximately full cycle rotation.

As the pivotable stop member 224 pivots toward the tapered stop abutment portions, either the upper portion 249 or the lower portion 250 of the sidewall of the pivotable stop leg 226 (FIG. 4) cams against the upper inner corner 252 or the lower inner corner 254 of the slidable stop member 426 depending upon the direction of rotation of the tape drive drum 212 and the control drum 232. This action moves the slidable stop member 426 in the slot 428 against the bias of spring 438 and disengages the locking pin 420 from the other control drum 424 thereby permitting the rotation thereof.

One tape drive drum may thus be constantly restrained against rotation in one direction while the other tape drive drum is permitted to rotate by the alternately operable latching means.

It will be appreciated that the secondary drum subassembly and stop means for the tapes 18 and 20 may be constructed similarly to that of the tapes 8 and 10. A roller bearing assembly 109 may be provided to separate the two sets of drum subassemblies and to permit relative rotation therebetween. Furthermore, shims may, if desired, be positioned to adjust the axial spacing of the drums along the axis 110 defined by the shaft 102.

Accurate indexing of the tapes may be facilitated by ball and socket indexing between the secondary drums.

THE TAPE MOUNTING AND MISCELLANEOUS HOUSING PARTS

Referring now particularly to FIGS. 5 and 10, the secondary drum subassembly 66, shown schematically in FIG. 10, may be provided with sprocket teeth 214 and 414 cooperating with sprocket holes (not shown) in tapes 8 and 10. The endless tapes 8 and 10 extend to the rear of the housing 2 about this subassembly 66 and to the forward end of the housing where they are looped about forward tape guides provided by shouldered shafts 112, 114, 116 and 118. These shafts may be mounted generally parallel to one another with the ends thereof received in plastic mounting blocks 120 and 122 secured to the rear part of the forward wall 16. Two shafts 112 and 114 may be spaced above the clear plastic window 124, while the remaining shafts 116 and 118 are spaced below, so that the generally straight portions of tapes pass in front window panels 12, 13, 14 and 15 described in connection with FIG. 1.

The tape 10 may pass around the shaft guide portions 126 and 128 approximately equal in extent to the width of the tape. These portions may be respectively formed by annular shoulders on the shafts 114 and 116 and the other tapes may be similarly mounted. The tapes 8 and 10 may all be the same length and may be interchangeably positionable due to the equal spacing of the shafts as shown. Furthermore, the shafts 114 and 116 may be rotatably mounted in the blocks 120 and 122 to minimize friction between the tapes and shafts. If desired, the tapes may alternatively be looped directly about the primary drums rather than about the shafts 112, 114, 116 and 118.

The window 124 may be illuminated by means of a plurality of lamps 130 each supported by a bracket 132 (FIG. 2). These brackets may be generally U-shaped and may be provided with flanged legs 134 secured to the blocks 120 and 122 by any suitable means, such as screws 136. The lamps 130 may be contacted by leaf springs 138 mounted on the rear of the brackets by grommets 140. These springs 138 may, in turn, be electrically connected to a suitable power source to provide energy for the lamps 130.

The previously identified sidewall, rear wall and front wall portions 52, 62, 98, 16 and 108 may, in the preferred embodiment, be mounted on and secured to a base member 111. The sidewalls may be attached together by means of spaced cross bars 142, 144, 146 and 148 (FIG. 3) and the entire control head may thus be readily disassembled for maintenance and/or repairs.

OPERATION

Operation of the device will be described with respect to the manual rotation of the control knob 6. Clockwise rotation of the knob 6 results in input rotation of the input gear 58 in a manner previously described, which tends to rotate both of the primary drums 202 and 402. However, since the stop control drum 422 is normally latched by the pin 420 on the spring biased slide member 426, only the drum 202 will rotate.

Rotation of the drum 202 results, through the gear train 210-208-216, in rotation of the secondary tape drive drum 212, and thus the tape 10. After the predetermined amount of clockwise rotation, the pin 236 on the control drum 232 will engage the leg 230 of the pivotable stop member 224 and move that stop member into abutment with the tapered stop surfaces 240 and 242 (FIG. 9). Further clockwise rotation of the tape drive for tape 10 is thereafter precluded. However, continued clockwise rotation of the knob will now result in movement of the tape 8, since the stop member 426 has been cammed out of locking engagement with the other control drum 424.

The gear train 410-418-416 is then operative to position the tape 8 through clockwise tape rotation. In the preferred embodiment, when the full numerical scale limit of the tape 8 has been reached, a pin (not shown) projecting from the drum 424 may engage either the top or bottom surfaces 429 and 431 of a stationary stop 427 (see FIG. 4) on a crossbar 146.

At the point of engagement between the pin and the tapered surface, the knob 6 cannot continue to rotate in the clockwise direction, since both control drums 202 and 402 are locked. It will, however, be appreciated that the latter stop for control drum 424 may be eliminated and merely serves as a reminder that the length of the tape 8 has been traversed.

In any event, counterclockwise rotation of the control knob 6 results in movement of the tape 10 while the spring bias provided by the leaf spring 438 moves the pin 230 into engagement with another of the slots 42 to latch the drum 424. This drum 424 is thereby prevented from rotating while the other tape reverse rotates until the tapered stops 244 and 246 are engaged by the pivotable stop 224.

Selection of an operating frequency without reference to the mechanical movements involved, may now be readily described. If it is assumed that tapes 8 and 10 are set at 270 kilocycles with the reading initially at 430 kilocycles, the control knob 6 may be rotated counterclockwise until the tape 10 registers "0" after which continued clockwise rotation of the control knob 6 permits tape 8 to be rotated to "2." The reverse rotation of the control knob 6 thereafter permits the tape 8 to be set at "7" without unlatching the tape 8. The machine readable indicia of the tapes 8 and 10 may control the appropriate switching mechanism to tune the remote circuit.

SUMMARY OF ADVANTAGES AND SCOPE OF THE INVENTION

The present invention thus provides a mechanical movement which is particularly advantageous in the remote control of tuners. Of particular significance is the fact that a single rotatable input controls two separate rotatable outputs.

Also of importance is the fact that the controlled output provides both visual indication of angular output position and remote control for an appropriate switching mechanism.

It will be apparent that forms of latching means other than that described, may be provided so long as rotation of one output is permitted while rotation of the other output is prevented.

Moreover, it will also be apparent to those skilled in the art that the entire primary or secondary drum subassembly may be dispensed with, in which case the latching means would be associated with the remaining drum assembly and the drums themselves may be provided with the visible and machine readable indicia as previously described. If, for example, the secondary drum assembly only were employed, the input gear 58 could be mounted coaxially with and coupled to the shaft 419.

This shaft 419 might then be shaped as the shaft 66 and be provided with the caged ball slip clutch to frictionally couple drums 212 and 412 as described in connection with the coupling of the drums 202 and 402 rather than being integral with the drum 412. Of course, locking of the drum 412 by means of the locking drum 424 would then be precluded, but the slide 426 could be provided with a lateral arm having a projecting pin biased directly into engagement with notches provided directly on the drum 412. Since the contact block pickup 21 could be moved to the upper portion of the housing 2 as previously described, it would not interfere with the lateral extension on the slide 426.

Although the invention has been described with reference to one preferred embodiment, it will be appreciated by those skilled in the art that additions, modifications, substitutions, deletions and other changes not specifically described may be made within the spirit of the invention as defined in the following claims.

I claim:

1. The method of adjusting the angular position of two drums, one of which having a limited degree of rotational freedom, comprising the steps of:

a. rotating said one drum in a first direction to the limit of its rotational freedom while preventing rotation of the other of said drums,
   b. rotating said other drum in said first direction while holding said one drum at the limits of its rotational freedom in said first direction, and
   c. rotating said one drum in the reverse direction to an angular position within the limits of its rotational freedom while preventing rotation of said other drum.

2. The method according to claim 1 wherein: the step of rotating said other drum in said first direction is performed responsively to movement of said one drum to the limits of its rotational freedom.

3. A mechanical movement comprising:
   first and second rotary outputs,
   rotary input means for independently rotating said outputs, and
   means responsive to rotation of said input means to a predetermined angular position in one direction for rotation of one of said output means in a first direction, said means being responsive to continued rotation of said input means in said one direction for rotation of the other of said output means in said first direction, said means being responsive to rotation of said input means to a predetermined angular position in a direction opposite to said one direction for rotation of said one output means in a direction opposite to said first direction, said means being responsive to continued rotation of said input means in said opposite direction for rotating said other output means in said opposite direction.

4. A mechanical movement according to claim 3 including means for limiting the rotation of both of said rotary outputs and said rotary input, the rotational freedom of one of said rotary outputs being substantially greater than the rotational freedom of the other of said rotary outputs.

5. A mechanical movement comprising:
   first and second rotary outputs,
   rotary input means for independently rotating said outputs, and
   latching means operable for selectively preventing the rotation of one of said rotary outputs while permitting rotation of the other of said rotary outputs, and for alternately preventing the rotation of said other rotary output while permitting rotation of said one rotary output,
   said first and second rotary outputs each comprising a drum system including first and second drums, said first drums being mounted for rotation in response to rotation of said rotary input means, said second drums being mounted for rotation in response to the rotation of the first drum of the respective drum system,
   said alternately operable latching means including:
   a first movable stop member biased toward a first position wherein the second drum of one of said drum systems is latched and being movable to a second position out of engagement with the second drum of said one drum system,
   a second movable stop member movable between a first position wherein the second drum of the other of said drum systems is prevented from rotating in a first direction, and a second position wherein the second drum of said other drum system is permitted to rotate in said first direction,
   said second movable stop member including means responsive to the latching of the second drum of said other drum system for moving said first movable stop member to its second position.

6. A mechanical movement according to claim 5 including:
   means on the second drum of said other drum system for moving said second movable stop member to its first position.

7. A mechanical movement according to claim 5 wherein:
   said second movable stop member is movable to a third position wherein the second drum of said drum system is prevented from rotating in a second direction, and wherein the second drum of said other drum system includes means for moving said second movable stop between said first and third positions, said first movable stop member being movable to said second position in response to movement of said second movable stop member to one of said first and third positions.

8. Apparatus comprising:
a control member movable in two opposite directions,
first and second tapes each movable in two opposite directions responsively to movement of said control member, and
latching means for substantially preventing movement of one of said tapes while permitting movement of the other of said tapes in a first direction, said latching means being operable in response to movement of said control member to permit movement of said other tape in said one direction while substantially preventing movement of said one tape.

9. Apparatus according to claim 8 including means for visually indicating the position of each of said tapes and for generating an electrical signal representative of the position of each of said tapes.

10. Apparatus comprising:
a rotary input,
two rotary outputs, each independently rotatable in response to rotation of said rotary input,
first stop means normally biased to a position to prevent rotation of one of said rotary outputs while permitting rotation of the other of said outputs within predetermined angular limits,
second stop means for preventing rotation of the other of said outputs beyond said predetermined angular limits, and
means responsive to the engagement of said other output with said second stop means for releasing said first stop means to thereby permit rotation of said one rotary output.

11. Apparatus according to claim 10 including:
two tapes, each respectively movable in response to movement of one of said outputs, each of said tapes including visible indicia for indicating the position of the tape and machine readable indicia; and
means responsive to said machine readable indicia for generating an electrical signal representative of the position of each of said tapes.

12. Apparatus according to claim 10 wherein said second stop means comprises:
an elongated lever pivotable about an axis passing through a point intermediate the ends thereof,
abutment means to prevent pivotal movement of said lever beyond predetermined limits, and
means operatively connected to said other output for pivoting said lever between said abutment means and for preventing rotation of said other output beyond said predetermined limits.

13. Apparatus according to claim 12 including:
two tapes, each respectively movable in response to movement of one of said outputs, each of said tapes including visible indicia for indicating the position of the tape and machine readable indicia; and
means responsive to said machine readable indicia for generating an electrical signal representative of the position of each of said tapes.

14. A mechanical movement comprising:
first and second rotary outputs,
rotary input means for independently rotating said outputs, and
latching means operable responsively to said rotary input means for selectively preventing the rotation of one of said rotary outputs while permitting rotation of the other of said rotary outputs, and for alternately preventing the rotation of said other rotary output while permitting rotation of said one rotary output,
said first and second rotary outputs each comprising a drum system including first and second drums,
said first drums being mounted for rotation in response to rotation of said rotary input means,
said second drums being mounted for rotation in response to the rotation of the first drum of the respective drum system.

15. A mechanical movement comprising:
first and second rotary outputs,
rotary input means for independently rotating said outputs, and
latching means operable responsively to said rotary input means for selectively preventing the rotation of one of said rotary outputs while permitting rotation of the other of said rotary outputs, and for alternately preventing the rotation of said other rotary output while permitting rotation of said one rotary output,
said alternately operable latching means including:
a first movable stop member biased toward a first position wherein the second drum of one of said drum systems is latched and being movable to a second position out of engagement with the second drum of said one drum system,
a second movable stop member movable between a first position wherein the second drum of the other of said drum systems is prevented from rotating in a first direction, and a second position wherein the second drum of said other drum system is permitted to rotate in said first direction,
said second movable stop member including means responsive to the latching of the second drum of said other drum system for moving said first movable stop member to its second position;
wherein said latching means is operable in response to the angular position of said rotary input; and
including means for limiting the rotation of both of said rotary outputs and said rotary input, the rotational freedom of one of said rotary outputs being substantially greater than the rotational freedom of the other of said rotary outputs.